United States Patent Office 3,556,739
Patented Jan. 19, 1971

3,556,739
CLEANING PHOSPHORIC ACID INCLUDING RECOVERY FROM THE ORGANIC SOLVENT BY HEATING TO STRATIFY INTO AN ACID LAYER AND AN ORGANIC LAYER
Avraham Matitiahu Baniel, and Ruth Blumberg, Haifa, Israel, assignors to Israel Mining Industries—Institute for Research and Development, Haifa, Israel, an Israeli company
No Drawing. Continuation-in-part of application Ser. No. 610,758, Jan. 23, 1967, which is a continuation-in-part of application Ser. No. 438,093, Mar. 8, 1965. This application Oct. 24, 1968, Ser. No. 770,410
Int. Cl. B01d 11/04; C01b 25/22
U.S. Cl. 23—312                                  8 Claims

ABSTRACT OF THE DISCLOSURE

Process which comprises extracting technical grade phosphoric acid with certain organic solvents selected from the group of esters, ketones and glycol ethers, which fulfill the conditions set forth below, a small proportion of sulfuric acid being advantageously admixed with the technical grade phosphoric acid prior to said extraction:

(a) Practically not to extract $H_3PO_4$ from an aqueous phosphoric acid whose $H_3PO_4$ concentration is below a threshold value of about 35% by weight;

(b) To extract, from an aqueous phosphoric acid of a concentration above the aforesaid threshold value, a substantial proportion of $H_3PO_4$, which is the larger the higher the $H_3PO_4$ concentration of the aqueous acid;

(c) To possess a temperature-dependent capability of dissolving phosphoric acid, being substantially greater at low temperatures than at high temperatures;

separating an $H_3PO_4$-containing solvent extract from the residual technical-grade phosphoric acid, and recovering purified phosphoric acid from said extract.

---

This application is a continuation-in-part of our application Ser. No. 610,758 filed Jan. 23, 1967, which, in turn, is a continuation-in-part of our application Ser. No. 438,093, filed Mar. 8, 1965, both applications being now abandoned.

This invention relates to the recovery of purified, and possibly more concentrated, phosphoric acid from technical-grade phosphoric acid. In connection with this invention the term "technical-grade phosphoric acid" means aqueous phosphoric acid, usually manufactured by the decomposition of rock phosphate with sulphuric acid, having an $H_3PO_4$ concentration of not less than 35% and possibly up to about 90% and containing the usual impurities of such phosphoric acid.

It has already been suggested that a purer phosphoric acid may be recovered from technical-grade phosphoric acid by extraction with organic solvents, whereby $H_3PO_4$ is extracted and water and impurities are left in the residue. Many widely different solvents have been stated to be suitable for this purpose, apparently without preference for any particular type of solvent. This purification method has not become practical for several reasons: the selectivity of the solvents between phosphoric acid and water, i.e. their capability of preferentially extracting $H_3PO_4$, has been too small; the proportion of $H_3PO_4$ extracted in one single run is too small; from the extract the solvent has to be removed by distillation or re-extraction into water, the former requiring special apparatus and a large consumption of heat, while by re-extraction with water the phosphoric acid becomes diluted.

It has also been proposed, as disclosed in U.S. Pats. Nos. 3,318,661 and 3,367,738, to purify phosphoric acid by contacting impure aqueous phosphoric acid with, in the case of the first of said patents diisopropyl ether, and, in the case of the second of said patents diethyl ether, whereby two separate liquid phases are formed, one of said phases, in the processes of each of said patents, being an aqueous impure phosphoric phase, and the other being a purified phosphoric acid-water-diisopropyl ether or ethyl ether (as the case may be) complex phase, said phases then being separated and the purified phosphoric acid then being recovered from said complex phase. Such procedures are effective.

We have discovered that certain other types of organic solvents, not disclosed nor suggested in the aforesaid U.S. Pats. Nos. 3,318,661 and 3,367,738, are also highly satisfactory for purifying or cleaning impure aqueous phosphoric acid. We have also made certain additional discoveries which are of distinct advantage in the overall process of purifying or cleaning impure aqueous phosphoric acid, all as is hereafter described in detail.

The organic solvents which we have found to be useful in the practice of our present invention are certain esters, ketones and glycol ethers. The organic solvents of these classes must fulfill the following conditions:

(a) Practically not to extract $H_3PO_4$ from an aqueous phosphoric acid whose $H_3PO_4$ concentration is below a threshold value of about 35% by weight;

(b) To extract, from an aqueous phosphoric acid of a concentration above the threshold value aforesaid, a substantial proportion of $H_3PO_4$, generally a proportion of $H_3PO_4$ which is at least 20% by weight, and which is the larger the higher the $H_3PO_4$ concentration of the aqueous acid;

(c) To possess a temperature-dependent capability of dissolving phosphoric acid, such capability being substantially greater at low temperatures than at high temperatures.

Illustrative examples of the foregoing organic solvents are ethyl acetate, propyl acetate, isopropyl acetate, butyl acetate, isobutyl acetate, amyl acetate, isoamyl acetate, ethyl propionate, butyl propionate, ethyl butyrate, propyl butyrate, isopropyl butyrate, diethyl ketone, diisopropyl ketone, methyl-ethyl ketone, ethyl-amyl ketone, methyl isopropyl ketone, cyclohexanone, n-di-butyl carbitol, n-hexyl carbitol, and diisobutyl carbitol. The foregoing organic solvents advantageously contain from 2 to 15 carbon atoms.

The threshold values of phosphoric acid concentration below which the aforesaid organic solvents do not substantially extract $H_3PO_4$ from the aqueous acid are different for different ones of said organic solvents at the same temperature, and also different for the same organic solvent at different temperatures. Similarly, the temperatures at which a given organic system solvent $H_3PO_4$ is homogeneous and heterogenous, respectively, are different for different ones of said organic solvents. All these data can be determined empirically and provide a great variability of the conditions under which the extracting operation is carried out in each particular case, having regard to the concentration and degree of impurity of the technical-grade phosphoric acid available as a starting material, and the desired degree of purity and concentration of the extracted phosphoric acid.

In a preferred embodiment of the process according to the invention, the operations of extracting the technical-grade phosphoric acid and separating the extract from the residual technical-grade phosphoric acid are performed at a relatively low temperature at which a clear homogeneous extract is obtained, and this extract is heated to a temperature at which an acid phase is separated from an organic solvent phase. This phase separation can be facilitated by heating the extract, or by heating the extract to which has been added a small amount of either water or purified phosphoric acid, a substantial proportion of the solvent separating from the extract and being easily separated as by decantation. The low temperature utilized in accordance with this preferred embodiment during the extraction can be achieved in any of a number of ways as, for example, by evaporating in vacuo an adequate proportion of the organic solvent added to the technical-grade phosphoric acid; or, and again by way of illustration, the technical-grade phosphoric acid can be submitted to a heat exchange with a refrigerated brine, either before or after admixture of the organic solvent.

The temperatures at which the extractions are carried out, while variable, being dependent upon the particular organic solvent utilized and other factors, are relatively low and, in most cases, will fall within the range of about −5 to about 80° C. The temperatures to which the initially separated organic solvent extracts of the phosphoric acid are heated to bring about phase separation are likewise variable but will generally fall within the range of about 20 to about 100° C., and, better still, in the range of 40–80° C., again dependent upon the particular organic solvent utilized and other factors. Where temperature gradients or differences between the extraction temperature and the temperature of heating are relied upon to bring about phase separation, such gradients or temperature differences may vary over wide ranges depending upon selection of organic solvents and various other factors.

The process according to the invention can be used with particular advantage for single-run extracting operations in which the initial $H_3PO_4$ concentration of the technical-grade phosphoric acid is clearly above the threshold value below which the organic solvent used does not substantially extract $H_3PO_4$ at the working temperature, and so much organic solvent is used that by that single-run the $H_3PO_4$ concentration of the residual aqueous phosphoric acid is lowered substantially to the threshold value. As the organic solvent, the temperature differential between the states of clear solution and phase separation in the extract, and the starting concentration of the technical-grade phosphoric acid can be selected at will, the process according to the invention is highly flexible and adaptable to particular needs. Thus, the respective proportions of purified phosphoric acid and residual technical-grade phosphoric acid can be varied in accordance with requirements.

The yield of the purified acid obtained is dependent on concentration of the crude acid, the distribution coefficient of the acid between the aqueous and organic solvent phase as well as the nature and concentration of the impurities in the crude acid. The concentration at which wet process phosphoric acid is practically obtained in industry is limited to about 54% $P_2O_5$. Many plants cannot produce an acid over 50% $P_2O_5$ due to scaling properties of the acid in high concentrations. This fact, as mentioned, influences the yields of purified acid. For example, when using as crude acid a wet process phosphoric acid feed containing 0.68% $H^+$ (methyl orange as indicator) which corresponds to 50.5% of $P_2O_5$, a yield of 42% purified acid is obtained, calculated on the total amount of phosphoric acid in the feed. When the concentration of the feed is 0.735% $H^+$ which corresponds to 54% of $P_2O_5$, the yield is 65.5%.

The influence of the impurities in the crude acid feed on the purified acid yield is demonstrated, for example, by the fact that where the $H_3PO_4$ concentration in the feed is 70% and does substantially not contain any dissolved salts, the yield of purified acid is about 28%; but when the crude acid is of the same concentration and contains about 3% by weight of dissolved salts, the yield rises to about 40%.

It has been found, as a further feature of the present invention, that the yield of purified phosphoric acid can be improved by the incorporation in the technical-grade acid of a relatively small proportion of sulfuric acid, generally in the range of 0.1 to 5%, and, better still, from about 0.8 to 1.2%, by weight of the phosphoric acid. This further improvement is based on the surprising observation that, although sulfuric acid by itself distributes between water and the organic solvents concerned substantially like phosphoric acid in dependence on concentration and temperature, when admixed with phosphoric acid as specified above, it does not distribute in proportion to its content in the mixture but, rather, promotes the transfer of phosphoric acid from the aqueous into the organic solvent phase. In consequence, the yield of the purified acid increases. From the organic solvent extract obtained in this manner purified phosphoric acid can be recovered, as described above and hereafter, that is, by heating the extract to a temperature higher than that at which the extraction is effected. Thus, when proceeding in this manner, the operation of extracting the technical-grade phosphoric acid and separating the extract from the residual technical-grade phosphoric acid are performed at a relatively low temperature at which a clear homogeneous extract is obtained, and this extract is heated to a temperature at which an aqueous acid phase is separated from an organic solvent phase.

Still another aspect of the present invention centers about a procedure wherein technical-grade phosphoric acid is first extracted in accordance with the procedure described above and illustrated, the residual acid left behind after the separation of the organic solvent extract is then acidified by the addition of sulfuric acid in an amount of from 30 to 100% by weight of the phosphoric acid, the resulting mixture is subjected to a repeated extraction with an organic solvent of the type defined above, and a mixture of purified phosphoric and sulfuric acid is recovered from the resulting second extract. The mixture of purified phosphoric and sulfuric acid can be obtained from the second organic solvent extract, for example, by heating the extract to a temperature higher than that at which the extraction is effected. Thus, when proceeding in this manner, the operation of re-extracting the acidified residual acid and separating the second extract therefrom are performed at a relatively low temperature at which a clear homogeneous second extract is obtained, and the second extract is heated to a temperature at which an aqueous acid phase is separated from an organic solvent phase. Alternatively, the separation of a mixture of purified phosphoric and sulfuric acid from the second extract can be effected by the addition of water to the latter.

Quite generally it may be said that the separation of a mixture of purified phosphoric acid and sulfuric acid from the second extract is conducted in a similar manner as the separation of purified phosphoric acid from the first extraction resulting from the extraction of the technical-grade phosphoric acid.

The mixture of phosphoric and sulfuric acid obtained in the foregoing manners can be used, for example, for the decomposition of rock phosphate, the manufacture of fertilizers and the like. The advantage of this aspect of the invention is to enable additional $P_2O_5$ values to be recovered in an industrially utilizable form.

It has been observed, in connection with the utilization of the organic solvents pursuant to the present invention as described above, that said organic solvents are characterized by the further property that upon the addition of a relatively small amount of water to a phosphoric acid solution therein resulting from an extraction of crude phosphoric acid, the entire phosphoric acid is released in one single step in the form of an aqueous phosphoric acid solution whose $H_3PO_4$ content is above the threshold value of 35% by weight. Hence, it has been found that the foregoing procedures can be modified by subjecting technical-grade phosphoric acid to extraction with an organic solvent of the type specified above, separating the resulting $H_3PO_4$-containing organic solvent extract from the residual technical-grade phosphoric acid, adding water to the extract in an amount of from 3 to 20% by weight so as to obtain stratification into two phases, and separating the lower phase in the form of an aqueous solution containing at least 35% by weight of purified phosphoric acid. This procedure differs from the foregoing procedures in the manner in which recovery of the phosphoric acid from the organic solvent extract is effected. Whereas, in accordance with the earlier described procedures, such recovery is achieved by raising the temperature of the extract above that at which the extraction was effected, in accordance with this procedure the phase separation is brought about by the addition of water while the temperature is not raised. This procedure will be referred to hereinafter for short as "isothermic procedure." In spite of the fact that, by applying the isothermic procedure the product purified acid is somewhat more diluted than an acid obtained from the same technical-grade phosphoric acid with the same organic solvent when proceeding in accordance with the earlier procedures, there are cases where the modification is preferred in view of the fact that in this manner the refrigeration equipment is not required.

By the addition of water to the organic solvent extract for the separation therefrom of an aqueous purified phosphoric acid in accordance with the isothermic procedure the mixture will as a rule cool down by several ° C., e.g. 7–9° C. Preferably, this cooling is compensated by a controlled addition of heat so as to keep the temperature of the phases substantially the same as that of the extract prior to the addition of water.

In accordance with one embodiment of the isothermic procedure the required amount of water for bringing about the desired phase separation is added in a one-stage operation.

In accordance with another embodiment of the isothermic procedure the addition of water is effected in two stages. In the first of these only a relatively small portion of the totally required amount of water is added whereby a first fraction of aqueous phosphoric acid is obtained containing the bulk of any impurities that had been co-extracted by the organic solvent from the starting technical-grade phosphoric acid. This first fraction which although impure is much purer than the starting technical-grade phosphoric acid may be used for various purposes or be recycled. In the second stage the remainder of the totally required amount of water is added to the organic solvent extract and in this manner a highly purified aqueous phosphoric acid is obtained.

In accordance with yet another embodiment of the isothermic procedure the organic solvent extract is first washed in counter-current with water or an aqueous phosphoric acid solution and the thus purified extract is then admixed with the required amount of water. The aqueous phosphoric acid obtained in this manner is of a high degree of purity. In accordance with this embodiment the counter-current washing of the extract may be conducted in two or more stages.

Wet process phosphoric acid contains, as a rule, solids that are suspended and which settle slowly on storage. These solids do not interfere with the operation of the purification procedures of the present invention since they are retained in the aqueous phase. This property of the aqueous phase containing the impure acid to retain solids is a generally useful feature of the process as illustrated below:

(a) Various solid compounds with respect to which the feed acid is saturated may precipitate on extraction since their solubility product is exceeded. This is the case particularly with respect to gypsum, complex fluorophosphates, etc. This precipitation does not interfere with the smooth operation of the cleaning process and it permits further up-grading of the residual phosphoric acid by removing the impurities through centrifugation or settling.

(b) Silicon dioxide as finally ground quartz or active silica or active clay, known additives used to improve the colour of wet-process phosphoric acid and/or to retain fluorides, may be added to the wet-process phosphoric acid prior to the operation of the process without interfering with said operation, leading to an improvement in colour and increased purity of the cleaned phosphoric acid.

(c) In general, various reagents, known in the art for combining or precipitating impurity constituents of the acid, e.g. alumina for fluorides, active carbon for organic matter etc., can be used efficiently in conjunction with this process by being applied to the feed phosphoric acid prior to the extraction and being eliminated to the aqueous phase with the impure fraction of the phosphoric acid. Since the latter can, and usually will, be used for the manufacture of solid fertilizers such as triple superphosphate, their presence is not detrimental. Thus a large number of reagents known to improve the composition of wet-process phosphoric acid can be applied in conjunction of the present process with little added expense other than the cost of the reagents themselves.

(d) Calcium hydroxide, di-calcium phosphate, monocalcium phosphate and phosphate rock can be added to neutralize free sulfuric acid present in the feed phosphoric acid virtually exactly, to form a calcium sulphate precipitate, the slurry obtained being directly processed, all of the solid calcium salts obtained being retained in the aqueous phase and the clean phosphoric acid recovered from the organic solvent phase being practically free of sulfuric acid.

The various features of the present invention are illustrated by the following examples which are not to be construed as limitative since various changes and modifications can be made in the light of the guiding principles and teachings disclosed. All reference to parts and percentages is by weight.

EXAMPLE 1

160 g. of wet-process phosphoric acid containing 60.5% $H_3PO_4$ were stirred at 20° C. with 60 g. of cyclohexanone for 10 minutes, then the stirring was stopped. The mixture was allowed to stratify into two liquid phases, which were separated. The aqueous phase (at the bottom) contained about 56% of the phosphoric acid introduced, as well as the greater part of the impurities of the original wet-process acid. The solvent phase containing the balance of the original phosphoric acid was heated at 65° C. and while being heated was admixed with about 15 ml. of water. Phase separation was thereby achieved. The top phase consisted of the solvent. The $H_3PO_4$ contained in the bottom was purified aqueous phosphoric acid of a concentration of 58%. This purified phosphoric acid was neutralized with ammonia to give a solution of diammonium phosphate without the formation of any precipitate.

EXAMPLE 2

142 g. of wet-process phosphoric acid containing 70% $H_3PO_4$ (about 100 g. $H_3PO_4$) were stirred at 2° C. with 40 g. of butyl acetate for 10 minutes, then the stirring was stopped. The mixture was allowed to stratify into two liquid phases and the latter were separated. The solvent phase contained 38 g. of $H_3PO_4$ (calculated at 100% $H_3PO_4$), the balance being at the bottom, together with the impurities of the original technical-grade acid. The solvent extract phase was heated at 45° C. while being admixed with a small amount of water, in order to induce the phase separation. The bottom phase, which consisted of purified aqueous phosphoric acid of 65% $H_3PO_4$ concentration, was separated and concentrated to 95% without deposition of solids during the evaporation.

EXAMPLE 3

200 ml. of wet-process phosphoric acid (51% $P_2O_5$) were mixed at 25° C. with an equal volume of dibutyl ether of diethylene glycol, resulting in an aqueous phase and 320 g. of solvent extract containing 140 g. $H_3PO_4$ (calculated as 100% $H_3PO_4$). This extract was decanted and heated to 100° C., a small amount of water being added to induce phase separation. At the bottom, 200 g. of purified phosphoric acid (50% $P_2O_5$) was attained. This acid was concentrated to 95% $H_3PO_4$, without deposition of solids during evaporation.

EXAMPLE 4

To 1,000 g. of wet-process phosphoric acid (50% $P_2O_5$), 10 g. of concentrated $H_2SO_4$ were added in order to increase its acidity to 0.73% $H^+$ (methyl orange as indicator). The acid obtained was mixed with 375 g. of cyclohexanone and then treated as described in Example 1.

We claim:

1. The process which comprises subjecting an aqueous technical-grade phosphoric acid solution, containing from 35% to 90% $H_3PO_4$ and derived from the decomposition of rock phosphate with sulfuric acid, to extraction with those organic solvents which are selected from the group consisting of aliphatic esters, aliphatic and cycloaliphatic ketones and glycol ethers containing a total of 2 to 15 carbon atoms and which are characterized by possessing a temperature-dependency whereby they dissolve greater quantities of phosphoric acid at lower temperatures than at higher temperatures and further characterized in that their extraction power for phosphoric acid is the larger the higher the phosphoric acid concentration in the aqueous technical-grade phosphoric acid solution, the extraction of said aqueous technical-grade phosphoric acid solution being carried out at a temperature in the range of −5° C. to 80° C., and at which a clear, homogeneous extract is obtained, allowing the extraction mixture to stratify to effect phase separation of the resulting organic solvent extract to provide an $H_3PO_4$-containing organic solvent extract phase and a separate residual impure phosphoric acid phase, separating said phases, and then recovering purified phosphoric acid from said $H_3PO_4$-containing organic solvent extract phase by heating said extract to a higher temperature than the extraction temperature to effect separation into separate liquid phases one of which is an aqueous phosphoric acid phase containing purified phosphoric acid and the other of which is an organic solvent phase largely free of phosphoric acid.

2. A process according to claim 1, wherein a small amount of water is admixed with the extract in the last-mentioned phase separation step.

3. A process according to claim 1, wherein the heating of the extract to a higher temperature than the extraction temperature is effected under pressure.

4. A process according to claim 1, which includes the step of admixing the aqueous technical-grade phosphoric acid solution with a small proportion of sulfuric acid prior to the extraction with the organic solvent.

5. A process according to claim 4, wherein the amount of sulfuric acid is from 0.1 to 5% by weight of the phosphoric acid.

6. A process according to claim 1, wherein, after the aqueous technical-grade phosphoric acid solution is initially extracted with said organic solvent, the residual acid remaining from said extraction step of said aqueous technical-grade phosphoric acid solution and containing impurities, after the separation of the organic solvent extract phase, is acidified by the addition of sulfuric acid in an amount of from 30 to 100%, by weight of the phosphoric acid, the resulting mixture is subjected to a repeated extraction with an organic solvent fulfilling the aforesaid requirements, and a mixture of purified phosphoric and sulfuric acid is recovered from the resulting second extract.

7. A process according to claim 6, wherein the operations of repeated extraction of the acidified residual acid and separation of the extract therefrom are performed at a low temperature at which a clear homogeneous second extract is obtained, and this second extract is heated to a temperature at which an aqueous acid phase is separated from an organic solvent phase.

8. A process according to claim 6 wherein the mixture of purified phosphoric acid and sulfuric acid is separated from the second organic solvent extract by the addition of water to the latter.

References Cited

UNITED STATES PATENTS

| | | | |
|---|---|---|---|
| 1,857,470 | 5/1932 | Milligan | 23—312X |
| 1,929,443 | 10/1933 | Milligan | 23—312X |
| 1,981,145 | 11/1934 | Keller | 23—165 |
| 2,880,063 | 3/1959 | Baniel | 23—165 |
| 2,885,265 | 5/1959 | Cunningham | 23—312X |
| 3,298,782 | 1/1967 | Archambault | 23—312X |
| 3,304,157 | 2/1967 | Baniel | 23—165 |
| 3,318,661 | 5/1967 | Schallert | 23—312X |
| 3,338,674 | 8/1967 | Baniel | 23—312X |
| 3,367,738 | 2/1968 | Schallert | 23—107 |
| 3,388,967 | 6/1968 | Ramaradhya | 23—165 |
| 3,397,955 | 8/1968 | Champ | 23—312X |
| 3,410,656 | 11/1968 | Bunin | 23—312X |

WILBUR L. BASCOMB, JR., Primary Examiner

S. J. EMERY, Assistant Examiner

U.S. Cl. X.R.

23—165, 107